United States Patent
Llamas Virgen et al.

(10) Patent No.: US 11,748,153 B2
(45) Date of Patent: Sep. 5, 2023

(54) ANTICIPATED CONTAINERIZED INFRASTRUCTURE USED IN PERFORMING CLOUD MIGRATION

(71) Applicant: International Business Machines Corporation, Armonk, NY (US)

(72) Inventors: Paul Llamas Virgen, Zapopan (MX); Cassandra del Rocio Valadez Vital, Guadalajara (MX); Jorge Adrian Meneses Barragan, Guadalajara (MX); Francisco Pavel Reynoso Lomeli, Tlaquepaque (MX)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 17/104,138

(22) Filed: Nov. 25, 2020

(65) Prior Publication Data

US 2022/0164223 A1 May 26, 2022

(51) Int. Cl.
*G06F 9/455* (2018.01)
*G06F 9/48* (2006.01)
*G06F 11/36* (2006.01)
*G06F 9/50* (2006.01)

(52) U.S. Cl.
CPC ........ *G06F 9/4856* (2013.01); *G06F 9/45533* (2013.01); *G06F 9/5072* (2013.01); *G06F 9/5077* (2013.01); *G06F 11/3692* (2013.01)

(58) Field of Classification Search
CPC .................................................. G06F 9/4856
USPC ............................................................ 718/1
See application file for complete search history.

(56) References Cited

U.S. PATENT DOCUMENTS

| | | | | |
|---|---|---|---|---|
| 10,146,563 | B2 * | 12/2018 | Dettori | G06F 9/455 |
| 10,768,973 | B1 * | 9/2020 | Jin | G06F 16/178 |
| 11,010,218 | B1 * | 5/2021 | Karaya | G06F 8/60 |
| 2009/0049438 | A1 * | 2/2009 | Draper | G06F 8/34 |
| | | | | 717/168 |
| 2012/0198440 | A1 * | 8/2012 | Shah | G06F 9/545 |
| | | | | 718/1 |

(Continued)

FOREIGN PATENT DOCUMENTS

| CN | 105847045 A | 8/2016 |
|---|---|---|
| CN | 106020930 A | 10/2016 |

(Continued)

OTHER PUBLICATIONS

"Notification of Transmittal of the International Search Report and the Written Opinion of the International Searching Authority,or the Declaration", From the International Searching Authority, International application No. PCT/CN2021/129353, dated Feb. 9, 2022, 10 pgs.

*Primary Examiner* — Mehran Kamran
(74) *Attorney, Agent, or Firm* — David B. Woycechowsky

(57) ABSTRACT

Technology for causing a computer system to: receive a migration plan for migration of computer data and/or computer software, generate containerized migration file(s) according to the migration plan; copy the containerized migration file(s) into a set of container(s) so that the migration plan can be implemented using a container from the set of containers; and migrate computer data and/or computer software between a source computer sub-system and a target computer sub-system using a container from the set of containers to implement the migration plan.

12 Claims, 4 Drawing Sheets

(56) References Cited

U.S. PATENT DOCUMENTS

| | | | |
|---|---|---|---|
| 2015/0222702 A1* | 8/2015 | Salle | G06F 9/4856 709/201 |
| 2016/0041995 A1* | 2/2016 | Prinz, III | G06F 16/119 707/694 |
| 2016/0285958 A1* | 9/2016 | Das | G06F 9/45504 |
| 2016/0330277 A1* | 11/2016 | Jain | H04L 67/1095 |
| 2016/0378525 A1* | 12/2016 | Bjorkengren | G06F 9/45558 718/1 |
| 2017/0090960 A1* | 3/2017 | Anderson | G06F 9/5077 |
| 2017/0097818 A1* | 4/2017 | Heine | H04L 67/34 |
| 2018/0025160 A1* | 1/2018 | Hwang | G06F 9/455 726/25 |
| 2018/0074748 A1* | 3/2018 | Makin | H04L 67/142 |
| 2018/0196724 A1* | 7/2018 | Li | G06F 9/5072 |
| 2018/0196741 A1* | 7/2018 | Qureshi | G06F 9/45533 |
| 2018/0300124 A1* | 10/2018 | Malladi | H04L 67/12 |
| 2019/0079788 A1* | 3/2019 | Ruty | G06F 9/445 |
| 2019/0196876 A1* | 6/2019 | Chen | G06F 9/5077 |
| 2019/0250946 A1* | 8/2019 | Parameshwaran | G06F 9/5088 |
| 2019/0310872 A1* | 10/2019 | Griffin | G06F 8/71 |
| 2019/0324786 A1* | 10/2019 | Ranjan | G06F 9/45558 |
| 2019/0324798 A1* | 10/2019 | Zou | G06F 8/51 |
| 2020/0034193 A1* | 1/2020 | Jayaram | G06F 3/0644 |
| 2020/0057663 A1* | 2/2020 | Abbott | G06F 9/455 |
| 2020/0250008 A1* | 8/2020 | Cleave | H04H 20/74 |
| 2020/0304571 A1* | 9/2020 | Ranjan | H04L 41/0896 |
| 2020/0310899 A1* | 10/2020 | Kelam | G06F 11/0784 |
| 2021/0051061 A1* | 2/2021 | Reid | H04L 41/0893 |
| 2021/0109778 A1* | 4/2021 | Keating | G06F 9/4856 |
| 2021/0389990 A1* | 12/2021 | Nakamura | G06F 9/5088 |
| 2022/0164223 A1* | 5/2022 | Llamas Virgen | G06F 9/4856 |

FOREIGN PATENT DOCUMENTS

| | | |
|---|---|---|
| CN | 108228347 A | 6/2018 |
| CN | 109271249 A | 1/2019 |
| CN | 108415795 B | 4/2019 |
| CN | 111045780 A | 4/2020 |
| CN | 111966451 A | 11/2020 |
| JP | 2019133509 A | 8/2019 |

* cited by examiner

ANTICIPATED CONTAINERIZED INFRASTRUCTURE USED IN PERFORMING CLOUD MIGRATION

BACKGROUND

The present invention relates generally to the field of migration of computer software and/or data, and more particularly to migration of software and/or data in cloud type networks.

Virtualized computing environments (VCEs) are known. VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. This isolated user-space instances may look like real computers from the point of view of programs running in them. A computer program running on an ordinary operating system can see all resources (connected devices, files and folders, network shares, CPU power, quantifiable hardware capabilities) of that computer. However, programs running inside a container can only access, or "see," the container's contents and devices assigned to the container.

As the term is used herein, a "cloud computing system" is hereby defined as a computer system that is distributed over the geographical range of a communication network(s), where the computing work and/or computing resources on the server side are primarily (or entirely) implemented by VCEs (see definition of VCEs in previous paragraph). Cloud computing systems typically include a cloud orchestration module, layer and/or program that manages and controls the VCEs on the server side with respect to instantiations, configurations, movements between physical host devices, terminations of previously active VCEs and the like.

The Wikipedia entry for "data migration" (as of Oct. 30, 2020) states, in part, as follows: "Data migration is the process of selecting, preparing, extracting, and transforming data and permanently transferring it from one computer storage system to another. Additionally, the validation of migrated data for completeness and the decommissioning of legacy data storage are considered part of the entire data migration process. Data migration is a key consideration for any system implementation, upgrade, or consolidation, and it is typically performed in such a way as to be as automated as possible, freeing up human resources from tedious tasks. Data migration occurs for a variety of reasons, including server or storage equipment replacements, maintenance or upgrades, application migration, website consolidation, disaster recovery, and data center relocation." (footnotes omitted)

SUMMARY

According to an aspect of the present invention, there is a method, computer program product and/or system that performs the following operations (not necessarily in the following order): (i) receiving a migration plan for migration of computer data and/or computer software, the migration plan including: (a) a plurality of cloud services for a plurality of applications, (b) computer processing operations to implement dependencies existing among and between the applications of the plurality of applications, and (c) computer processing operations to implement middleware need to run the applications of the plurality of applications; (ii) generating containerized migration file(s) according to the migration plan; (iii) copying the containerized migration file(s) into a set of container(s) so that the migration plan can be implemented using a container from the set of containers; and (iv) migrating computer data and/or computer software between a source computer sub-system and a target computer sub-system using a container from the set of containers to implement the migration plan.

DETAILED DESCRIPTION

Figure 1:
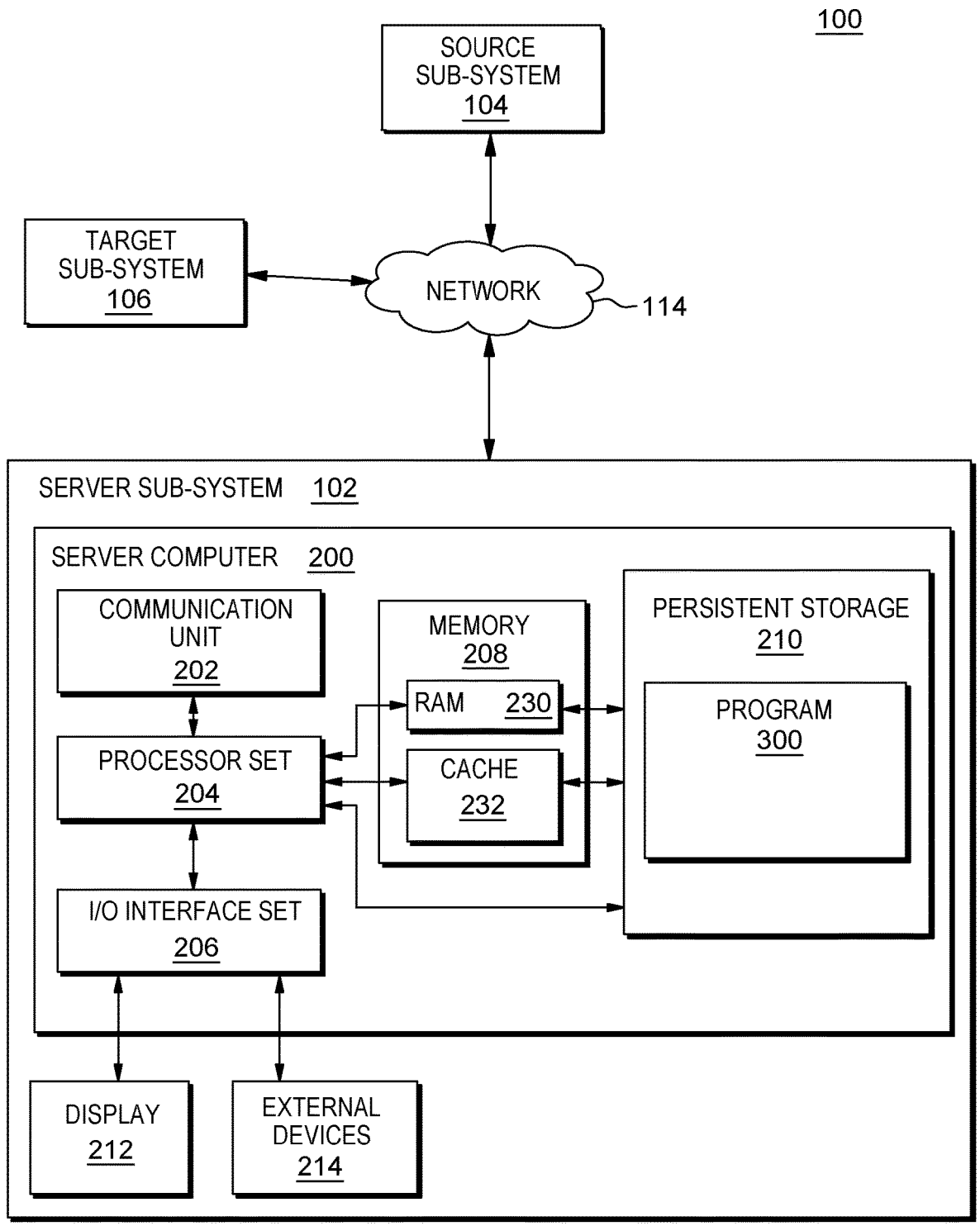
FIG. 1 is a block diagram of a first embodiment of a system according to the present invention.

Some embodiments of the present invention are directed to technology for causing a computer system to: receive a migration plan for migration of computer data and/or computer software, generate containerized migration file(s) according to the migration plan; copy the containerized migration file(s) into a set of container(s) so that the migration plan can be implemented using a container from the set of containers; and migrate computer data and/or computer software between a source computer sub-system and a target computer sub-system using a container from the set of containers to implement the migration plan.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); source subsystem 104, target subsystem 106; and communication network 114. Server subsystem 102 includes: server computer 200; communication unit 202; processor set 204; input/output (I/O) interface set 206;

memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figures 2, 3:
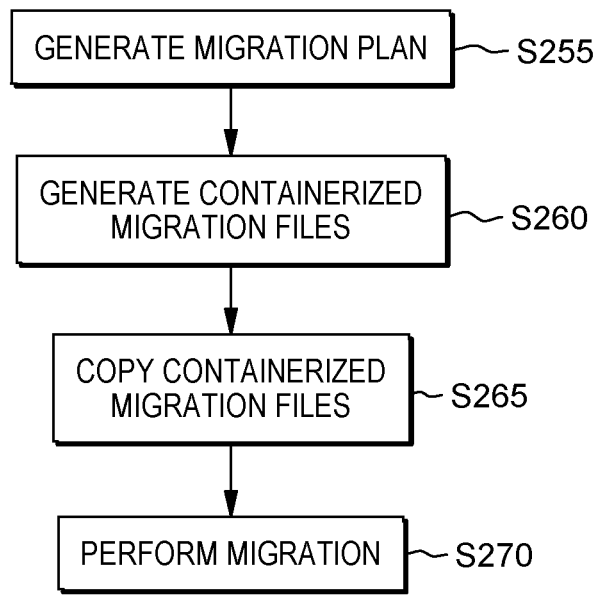
FIG. 2 is a flowchart showing a first embodiment method performed, at least in part, by the first embodiment system.
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where migration plan module ("mod") 302 generates a migration plan. The migration plan: (i) includes cloud services for a plurality of applications; (ii) computer processing operations to implement dependencies existing among and between the applications of the plurality of applications; and (iii) computer processing operations to implement middleware need to run the applications of the plurality of applications.

Processing proceeds to operation S260, where containerized migration files mod 304 generates containerized migration files according to the migration plan and including the various components of the migration plan listed in the previous paragraph.

Figure 4:
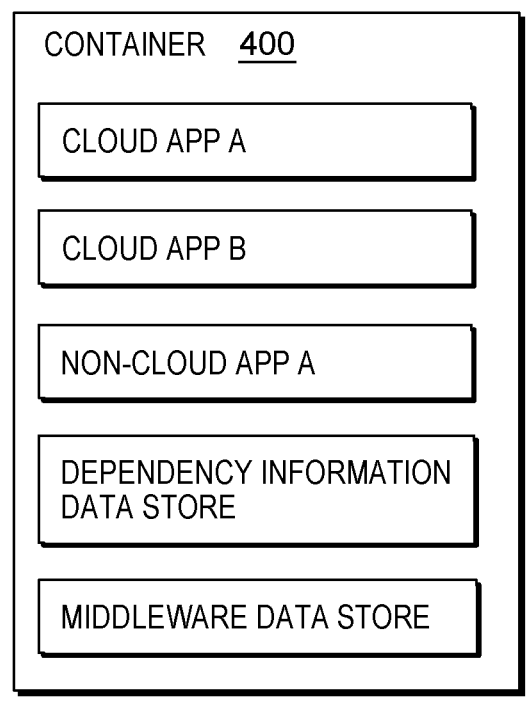
FIG. 4 is a screenshot view generated by the first embodiment system.

Processing proceeds to operation S265, where container creation mod 306 copies the containerized migration files into a set of containers so that the migration plan is included as part of one or more containers. In this example, there is a single container 400, as shown in FIG. 4.

Processing proceeds to operation S270, where migration execution mod 308 performs a migration between source sub-system 104 and target sub-system 106.

III. Further Comments and/or Embodiments

A method according to an embodiment of the present invention for containerized infrastructure to cloud migration includes the following operations (not necessarily in the following order): (i) in response to receiving information representative of infrastructure servers and applications, analyzing the information to identify associations with known container applications; (ii) in response to a determination to migrate the applications, generating an application target list for migration using information for identified associations; (iii) generating a migration plan, including cloud services, for different applications and associated installation steps to implement dependencies and middleware for the different applications; (iv) generating containerized migration files according to the migration plan, including cloud services, that are copied into a container; (v) testing services and ports working in a server for the containerized migration files; and (vi) in response to a positive test, generating a final service and exposing the ports.

Some embodiments of the present invention may include one, or more, of the following operations, features, characteristics and/or advantages: (i) provides a new way to analyze the existing bare metal or virtualized non-containerized environment to ease the migration to the suggested cloud provider; (ii) adapts migration code to the desired and feasible cloud providers; (iii) analyzes non-migrated-to-cloud environment(s) a solution for migration to containers; (iv) from a user's perspective, suggests the best cloud provider that can be used to monetize new features for cloud providers by finding an easy way to do it; (v) analyzes the infrastructure not already migrated to suggest the steps for the containerized applications; (vi) includes a mechanism to ease the migration; and/or (vii) identifies the best cloud provider based on the bare-metal or virtualized system configuration.

Some embodiments of the present invention recognize the following facts, potential problems and/or potential areas for improvement with respect to the current state of the art: (i) containerized environments in the cloud have become more and more common (for example, take an old application based on conventional infrastructures, change the way we see traditional architectures, and make them layer-based containers to take advantage of all the benefits of a cloud infrastructure such as efficiency/cost reduction, data security, scalability, mobility, and disaster recovery, etc.; (ii) every year thousands of applications are being migrated to cloud environments; (iii) the path to migrating to cloud environments is sometimes full of curves and holes, turning an easy task into a hard and painful responsibility; (iv) enterprises are aware of benefits of cloud environments; (v) enterprises see how they impact revenue by the cost reduction of hardware usage; (vi) determines what's the most convenient cloud infrastructure configuration for the user's applications and OSs (operating systems); (vii) using a cloud-based solution, an enterprise can prevent a lot of problems such as a malformed container and excessive use of resources that ends up wasting more hardware than before; and/or (viii) by using this method, you will be able to have intelligent containers running your applications by increasing performance and reducing costs.

Some embodiments of the present invention may include one, or more, of the following operations, features, characteristics and/or advantages: (i) relates to a predictive method able to package the current infrastructure (for example, processes, configuration files, parameters, running applications, dependencies, resources, etc.) to a desirable migration file, in other words, an automatically generated infrastructure image is containerized to be managed and fully operable; (ii) selects the best cloud configuration available at one specific period of time; (iii) includes using the best cloud environment from all providers; (iv) resides in containerized environments (for example, commercially available container software) that uses the creation of a set of instructions to create a container solution based on middleware, packages, and data from an endpoint; (v) migrates traditional architectures to a container layer based infrastructure in a fast and easy way; (vi) obtains the highest ranked cloud solution on the market; (vii) helps with automatic creation of container based file(s); (viii) anticipates, by intelligent reduction of services for an optimal and lightweight container or group of containers, a faster and more efficient application; and/or (ix) depending on the suggested solution, gets the migration files (once accepted) using the most accurate cloud configuration.

Some embodiments of the present invention may include one, or more, of the following operations, features, characteristics and/or advantages: (i) helps companies acquire the next generation of solutions for the future; (ii) helps the development demand to scale up services on cloud computing, in particular emerging containerized ecosystems in a computing environment; (iii) applications in infrastructure can take advantage of making the migration to cloud computing more doable; and/or (iv) utilizes a method which aims to analyze infrastructure environments to: (a) automatically generate containerized and adaptation of files for cloud migration, and (b) generates the best service and cloud solution configuration depending on available clouds.

Some embodiments of the present invention may include one, or more, of the following operations, features, characteristics and/or advantages: (i) analyzes all the information on several infrastructure systems to get the most accurate migration solution depending on the closest solution; and/or (ii) provides the option to choose between the different types of commercially available cloud providers, taking into consideration the clients application infrastructure and software requirements.

Some embodiments of the present invention recognize the following facts, potential problems and/or potential areas for improvement with respect to the current state of the art: (i) in a conventional infrastructure, systems and methods exist for the management of applications reducing the complexity to build an application or a complete set of applications; (ii) there are a lot of infrastructure problems for maintaining specific infrastructure software components; and/or (iii) when infrastructure software components are not required at the end of the migration, this can create a disaster.

Some embodiments of the present invention may include one, or more, of the following operations, features, characteristics and/or advantages: (i) analyzes the most accurate characteristics of an infrastructure, gathers those characteristics, and proposes a document for containerizing the application; and/or (ii) detects if an application can be containerized or not, depending on, but not limited to the following factors: (a) use of the application(s), and (b) system resources such as memory, space, etc.

Figure 5:
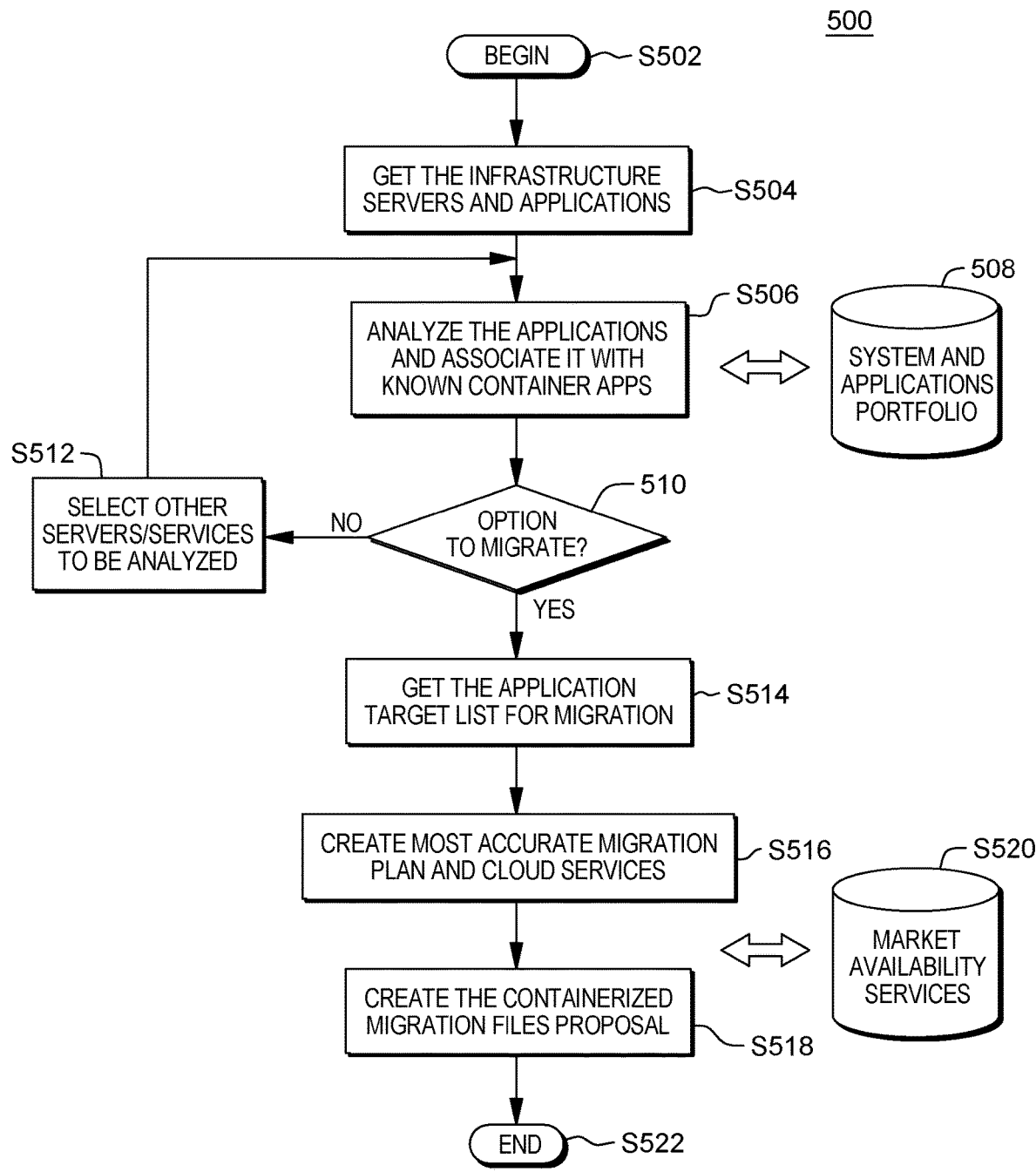
FIG. 5 is a flowchart showing a first embodiment method performed, at least in part, by the first embodiment system.

As shown in FIG. 5, flowchart 500 includes: begin block S502; get the infrastructure servers and applications block S504; analyze the applications and associate it with known container apps block S506; system and applications portfolio storage S508; option to migrate decision block S510; select other servers/services to be analyzed block S512; get the application target list for migration block S514; create most accurate migration plan and cloud services block S516; create the containerized migration files proposal block S518; market availability services storage S520; and end block S522.

In some embodiments of the present invention, the following additional information applies to the operations described in FIG. 5, flowchart 500 above where: (i) infrastructure servers within block S504 typically refer to both physical and virtual servers (for example, Power S390, PPC64LE, x86, VM (virtual machine) ware and any other virtual or physical server); (ii) applications within block S504 typically refer to backend applications which are running in the servers, databases services, web apps, mobile apps backend services, and/or frontend app services; (iii) container apps within block S506 typically are known because cloud catalog services exit and are assigned for each application (for example, if the application is running in a technology such as node.js, the mechanism will associate that application with the catalog offering of the cloud provider); (iv) a module within applications portfolio storage S508 typically includes a catalog of applications and services that are available from commercially available cloud services or cloud providers, where applications will be associated with and match the current infrastructure with the best cloud providers' services that fit; (v) select other servers/services to be analyzed block within block S512 typically means an iterative process to validate existing running services on the target infrastructure system in order to determine which of the services are available in the cloud offering from different providers to propose the best migration strategy; (vi) create most accurate migration plan and cloud services within block S516 typically means that a specific module analyzes the cloud offering to compare the different characteristics like middleware, costs, migration time, replicas, usage, etc., to select the best option for migration and propose the most accurate migration plan (for example, what files are necessary to ensure there will be a smooth migration, depending on the offering, so the most accurate migration plan provides the best fit of infrastructure services with the offering using the least amount of effort). In addition, if the service infrastructure runs on a DB2 database, then it will be likely that the migration points to a commercially available cloud service where the cloud service provides different DB2 standard tools, so the migration for that specific software component will be smooth. The information typically included will be migration files (for example, docker files, Kubernetes files, config files, etc.) which run on the cloud provider to ease the migration. Typically, different cloud providers may be chosen to run different applications and services, and in these cases, a hybrid cloud may be the best option to distribute services in different clouds. Market availability services storage S520 are typically commercially available cloud services or cloud providers.

As described in the following paragraphs, some embodiments of the present invention include automated analysis by the system for the creation of a containerized environment. In this case, this is an example of how the method will be analyzing the information, including the specific characteristics of a system where there are commercially available software applications running.

1. The method detects a Debian (OS (operating system)) environment which is ubuntu 14.04, but it is an old version. The method will check if an upgrade or migration can be done and if the application will still work. If yes, then the application will proceed. If no, but requires other packages, then these packages will be installed by the application. If the application does not support some package, then the same (old) version will be kept.

FROM ubuntu:18.04

2. The next step detects all services involved for different applications and gets the specific steps to install all the dependencies and middleware, such as commercially available software, which is detected by some embodiments of the present invention.

```
RUN apt-get update \
    && apt-get install -y git \
•&& docker-php-ext-install \
•&& pdo \•&& pdo_mysql \
•&& mysqli \•&&php -r
"copy('https://getcomposer.org/installer', 'composer-
setup.php');" \
•&& php composer-setup.php --install-dir=. --
filename=composer \
•&& mv composer /usr/local/bin/ \
•&& a2enmod rewrite
```

3. The next step is to take the configuration files and the application folder, where some embodiments of the present invention will create a copy of the files inside the container.

```
COPY /var/www/html /var/www/html/
COPY /etc./free and open-source cross-platform web
server software/free and open-source cross-platform web
server software.conf /etc/free and open-source cross-
platform web server software
COPY /etc/free and open-source cross-platform web
server software/sites-enabled/* /etc/free and open-
source cross-platform web server software/sites-
enabled/
```

4. The last step is to check the services and ports working inside the server to generate the service and expose the ports that need to be exposed.

EXPOSE 443 50000 636

After performing the analyze process, some embodiments of the present invention end up creating an optimal and efficient image containerized suggestion for the application, making a more efficient module, and cleaning up the non-used modules and resources.

```
FROM open-source software environment RUN apt-get
update \
    && apt-get install -y git \
•&& docker-php-ext-install \
•&& pdo \•&& pdo_mysql \
•&& mysqli \
```

-continued

```
•&&php -r
"copy('https://getcomposer.org/installer', 'composer-
setup.php');" \
•&& php composer-setup.php --install-dir=. --
filename=composer \
•&& mv composer /usr/local/bin/ \
•&& a2enmod rewrite
COPY /var/www/html /var/www/html/
COPY /etc/free and open-source cross-platform web
server software/free and open-source cross-platform web
server software.conf /etc/free and open-source cross-
platform web server software
COPY /etc/free and open-source cross-platform web
server software/sites-enabled/* /etc/free and open-
source cross-platform web server software/sites-
enabled/
EXPOSE 443 50000 636
```

5. Based on the middleware and other different options, some embodiments of the present invention detect the different services needed, and based on this, will give several options of cloud services the user can choose from. The system creates a demo instance for these cloud services and suggests it to the user.
Example output:
>cloud environments and instance, you can use, (for example):
(commercially available cloud computing services)
choose the option you want>

Based on this decision, creating the containerized migration files will be performed automatically in a specific cloud environment. Also, some embodiments of the present invention will anticipate the file creation for cloud construction and orchestration in case it is necessary.

```
apiVersion: apps/v1
kind: Deployment
metadata:
    name: app-deployment
spec:
    selector:
        matchLabels:
            app: free and open-source cross-platform
web server software
    replicas: 2
    template:
        metadata:
            labels:
                app: free and open-source cross-platform
web server software
        spec:
            containers:
            -name: free and open-source cross-platform web
server software
                image: localimagegenerated:latest
                ports:
                -containerPort: 443
```

Once this operation finishes, the user will get all specific files for migration and the plan that fits with the infrastructure evaluation.

Some embodiments of the present invention may include one, or more, of the following operations, features, characteristics and/or advantages pertaining to a server running an old commercially available applications which requires php 5.2, apache 2.2, DB2 client for php, UCD (user-centered design) for automatic deployment and a new relic: (i) provides a base dockerfile with all the application requirements such as db2driver and PDO DB2; (ii) adds the requirements for UCD agent tokens and configuration files; (iii) copies the license file for the new relic and places them in the correct files; (iv) the ports specified by the .env of the app will be exposed and the ports for the apache service and database service will also be exposed; (v) based on the analysis of the application and the software requirements, the user will be provided with the information needed to choose the correct cloud providers; (vi) as this is a DB2 driver, the method will choose only those that support to this kind of middleware, giving the result of a commercially available cloud provider; (vii) if the user choses the specific cloud which was on the list of commercially available cloud providers, the method will generate the YAML (YAML ain't markup language) files for the orchestrator; (viii) for the orchestrator, a YAML will be generated with the service of ports that have to be opened, and the deployment will be generated; and/or (ix) the final results will be a container-based file and a specific YAML cloud based file (based on the cloud offering of the selected cloud provider) for the solution container, thus making the migration easier.

Some embodiments of the present invention may include one, or more, of the following features, characteristics and/or advantages: (i) provides an instruction text based container (to build whatever is in there) by providing an intelligent and optimal way to build it; (ii) creates a container based on a system; (iii) is an intelligent container creator based on the application architecture; (iv) provides a way to make an optimal container from a code perspective; (v) provides a prediction on how layers can be an optional architecture for the users application; (vi) includes specific analysis of infrastructure; and/or (vii) makes a link between what is necessary and what is indispensable for the application to work in an optimal and easy way.

Some embodiments of the present invention may include one, or more, of the following features, characteristics and/or advantages: (i) while there exist several commercially available software based tools that can gather information about the system itself, some embodiments of the present invention may associate the best cloud provider or migration mechanism; and/or (ii) selects the best for the infrastructure itself in terms of cost, performance, migration time, among others, that include but are not limited to software and emerging technologies, privacy and compliance, high availability, security, scalability, and portability, among others.

Some embodiments of the present invention may include one, or more, of the following features, characteristics and/or advantages: (i) to get or identify the target list for migration, some methods according to the present invention will containerize the suggestions to generate an efficient image to be instantiated in the different options of the cloud ecosystem; (ii) provides a mechanism for smart migration; (iii) provides a mechanism for generating insights, by machine logic, regarding how to decrease some aspect of the infrastructure included in the customer's configuration (for example, number of servers configured to be allocated for a specific purpose); (iv) provides a mechanism for generating insights, by machine logic, regarding proposals to software architects, product owners, technical leaders or others for changes to the hybrid infrastructure, where hybrid infrastructure typically refers to an infrastructure where the systems are not necessarily the same type of hardware or virtualization technology; (v) provides insights for optimizing the migration and proposing not only the whole migration but smart pieces of it considering different factors to optimize; and/or (vi) minimizes cost migration time, and/or maximizes performance, and typically includes data transfer rate, flops, network performance, resiliency, etc.

Some embodiments of the present invention may include one, or more, of the following features, characteristics and/or advantages: (i) in the currently conventional art for using machine logic to plan a data migration, most of the ideas, solutions or products assume the whole infrastructure migration will be migrated and based on that generates a plan for it, but sometimes various embodiments of the present invention will instead provide smartly selective insights about what specific components of the infrastructure could be migrated to optimize it, especially when the infrastructure is a hybrid infrastructure; (ii) provides a plan with multiple possible cloud providers used, and/or at least considered for use, in the plan; (iii) considers a plurality of cloud services aligned to the infrastructure plans; (iv) machine logic determines selective migration of components through constant analysis of infrastructure for suggesting cloud providers and their implications in order to optimize it; (v) sometimes the infrastructure should not be migrated entirely but specific part of it; (vi) is advantageous in that various embodiments of the present invention control a selective migration of infrastructure; (vii) a selective migration of infrastructure, as that phrase is used herein, typically does not migrate everything, but, rather, only a portion of the infrastructure; (viii) provides insights about where is the best fit cloud provider for a specific software piece; (ix) proposes hybrid environment insights in order to reduce the number of systems in the infrastructure gradually and provide the specific cloud provider and the documents or files for the migration; (x) multiple infrastructures (where multiple infrastructures typically refer to the idea that a client may handle more than one infrastructure (probably the most accurate term could be plurality of infrastructures) and multiple service providers, and the combination of them, will be making the best hybrid solution; and/or (xi) provides the specific files, components needed for achieving purposes mentioned in one or more of the foregoing items on this list.

IV. Definitions

Present invention: should an not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

What is claimed is:

1. A computer-implemented method (CIM) comprising:
receiving a migration plan for migration of computer data and/or computer software, the migration plan including: (i) a plurality of cloud services for a plurality of applications, (ii) computer processing operations to implement dependencies existing among and between the applications of the plurality of applications, and (iii) computer processing operations to implement middleware need to run the applications of the plurality of applications;
generating the migration plan, with the generation of the migration plan including:
identifying a plurality of infrastructure servers to be involved in the migration, identifying the plurality of applications, and
analyzing the plurality of applications to identify associations with respectively corresponding cloud services;
generating containerized migration file(s) according to the migration plan;
copying the containerized migration file(s) into a set of container(s) so that the migration plan can be implemented using the set of containers; and
testing services and ports working in a server for the containerized migration file(s) to obtain a positive test result;
migrating computer data and/or computer software between a source computer sub-system and a target computer sub-system using the set of containers to implement the migration plan.

2. The CIM of claim 1 wherein the containerized migration file(s) include a plurality of cloud services.

3. The CIM of claim 2 wherein the copying of the containerized migration file(s) into a set of container(s) includes copying information about the plurality of cloud services.

4. The CIM of claim 1 further comprising: in response to the positive test result:
generating a final service, and
exposing the ports.

5. A computer program product (CPP) comprising:
a set of storage device(s); and computer code stored collectively in the set of storage device(s), with the computer code including data and instructions to cause a processor(s) set to perform at least the following operations:
receiving a migration plan for migration of computer data and/or computer software, the migration plan including: (i) a plurality of cloud services for a plurality of applications, (ii) computer processing operations to implement dependencies existing among and between the applications of the plurality of applications, and (iii)

computer processing operations to implement middleware need to run the applications of the plurality of applications, generating the migration plan, with the generation of the migration plan including:

identifying a plurality of infrastructure servers to be involved in the migration, identifying the plurality of applications, and analyzing the plurality of applications to identify associations with respectively corresponding cloud services;

generating containerized migration file(s) according to the migration plan, copying the containerized migration file(s) into a set of container(s) so that the migration plan can be implemented using the set of containers, and testing services and ports working in a server for the containerized migration file(s) to obtain a positive test result;

migrating computer data and/or computer software between a source computer sub-system and a target computer sub-system using the set of containers to implement the migration plan.

6. The CPP of claim 5 wherein the containerized migration file(s) include a plurality of cloud services.

7. The CPP of claim 6 wherein the copying of the containerized migration file(s) into a set of container(s) includes copying information about the plurality of cloud services.

8. The CPP of claim 5 wherein the computer code further includes instructions for causing the processor(s) set to perform the following operation(s): in response to the positive test result:

generating a final service, and exposing the ports.

9. A computer system (CS) comprising:

a processor(s) set;

a set of storage device(s); and computer code stored collectively in the set of storage device(s), with the computer code including data and instructions to cause the processor(s) set to perform at least the following operations:

receiving a migration plan for migration of computer data and/or computer software, the migration plan including: (i) a plurality of cloud services for a plurality of applications, (ii) computer processing operations to implement dependencies existing among and between the applications of the plurality of applications, and (iii) computer processing operations to implement middleware need to run the applications of the plurality of applications, generating the migration plan, with the generation of the migration plan including:

identifying a plurality of infrastructure servers to be involved in the migration, identifying the plurality of applications, and analyzing the plurality of applications to identify associations with respectively corresponding cloud services;

generating containerized migration file(s) according to the migration plan, copying the containerized migration file(s) into a set of container(s) so that the migration plan can be implemented using the set of containers, and testing services and ports working in a server for the containerized migration file(s) to obtain a positive test result migrating computer data and/or computer software between a source computer sub-system and a target computer sub-system using the set of containers to implement the migration plan.

10. The CS of claim 9 wherein the containerized migration file(s) include a plurality of cloud services.

11. The CS of claim 10 wherein the copying of the containerized migration file(s) into a set of container(s) includes copying information about the plurality of cloud services.

12. The CS of claim 9 wherein the computer code further includes instructions for causing the processor(s) set to perform the following operation(s): in response to the positive test result: generating a final service, and exposing the ports.

* * * * *